Sept. 11, 1956  F. CAMPOS  2,762,561
CARRIAGE CONTROLS FOR CALCULATING MACHINE
Filed Nov. 15, 1954  13 Sheets-Sheet 1

Inventor
Francisco Campos
By Allen & Allen
attorneys

Sept. 11, 1956  F. CAMPOS  2,762,561
CARRIAGE CONTROLS FOR CALCULATING MACHINE
Filed Nov. 15, 1954  13 Sheets-Sheet 2

Inventor
Francisco Campos
By Allen & Allen
attorneys

Sept. 11, 1956  F. CAMPOS  2,762,561
CARRIAGE CONTROLS FOR CALCULATING MACHINE
Filed Nov. 15, 1954  13 Sheets-Sheet 3

Inventor
Francisco Campos
By Allen + Allen
Attorneys

Sept. 11, 1956      F. CAMPOS      2,762,561
CARRIAGE CONTROLS FOR CALCULATING MACHINE
Filed Nov. 15, 1954      13 Sheets-Sheet 4

Inventor
Francisco Campos
By Allen & Allen
attorneys

Sept. 11, 1956  F. CAMPOS  2,762,561
CARRIAGE CONTROLS FOR CALCULATING MACHINE
Filed Nov. 15, 1954  13 Sheets-Sheet 5
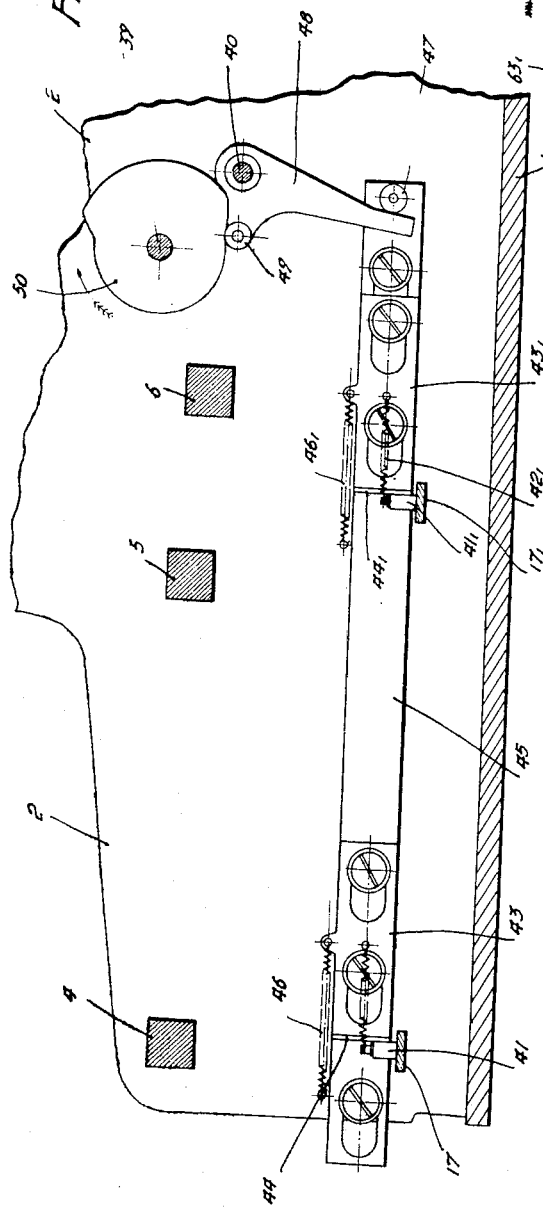
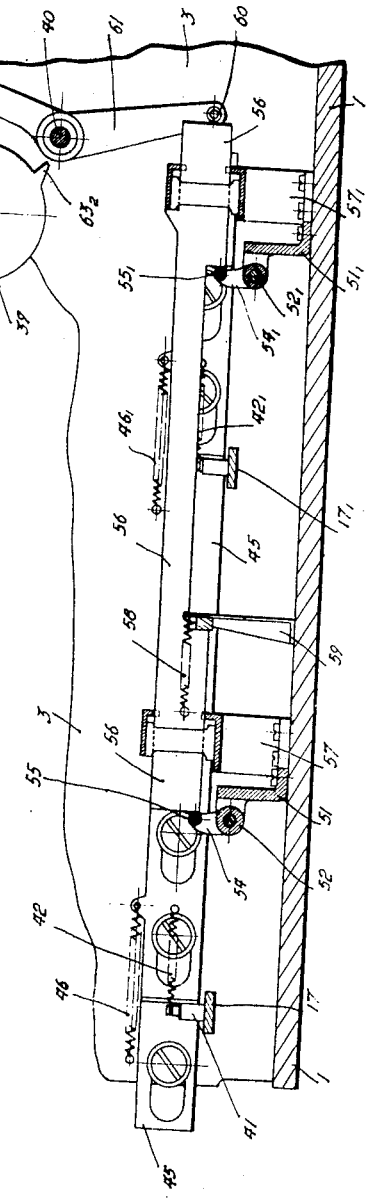
Inventor
Francisco Campos
By Allen & Allen
Attorneys

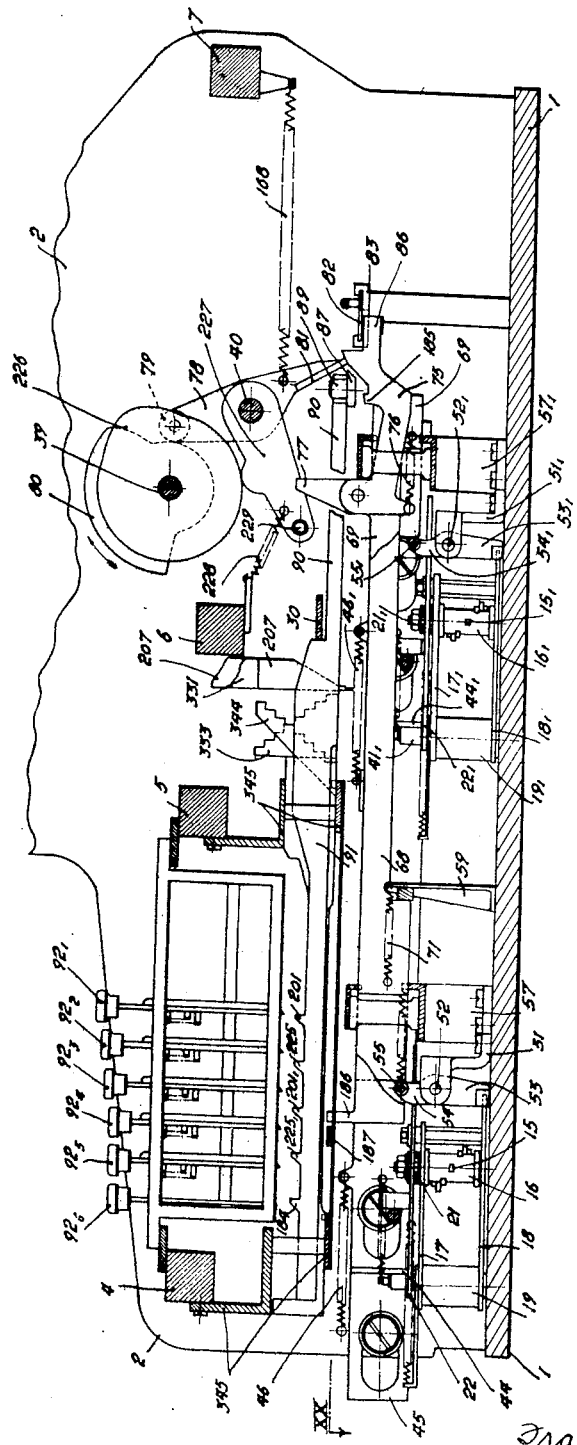

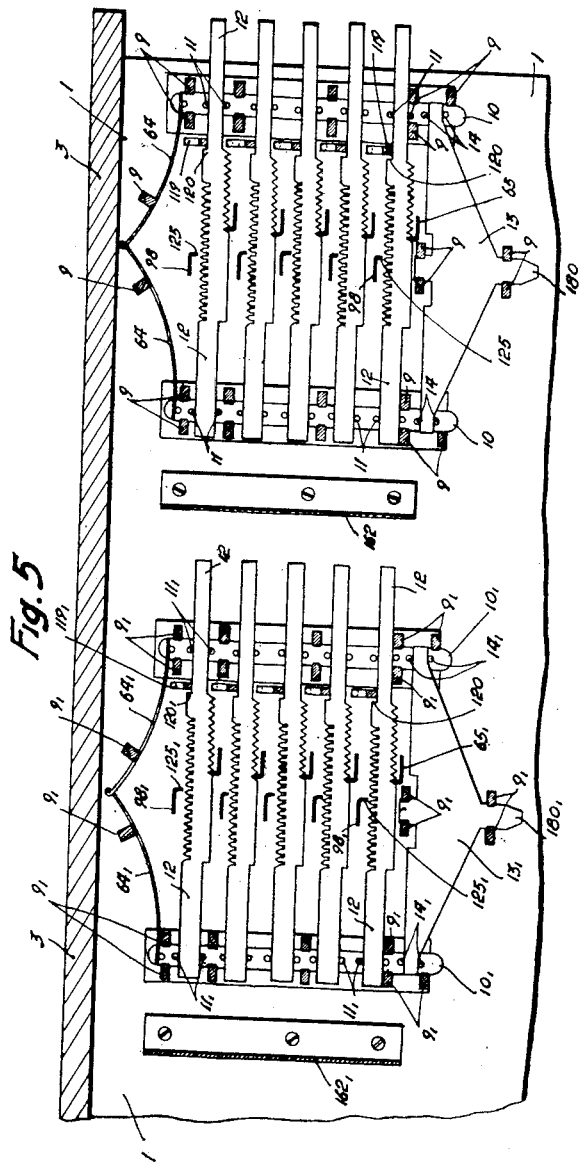

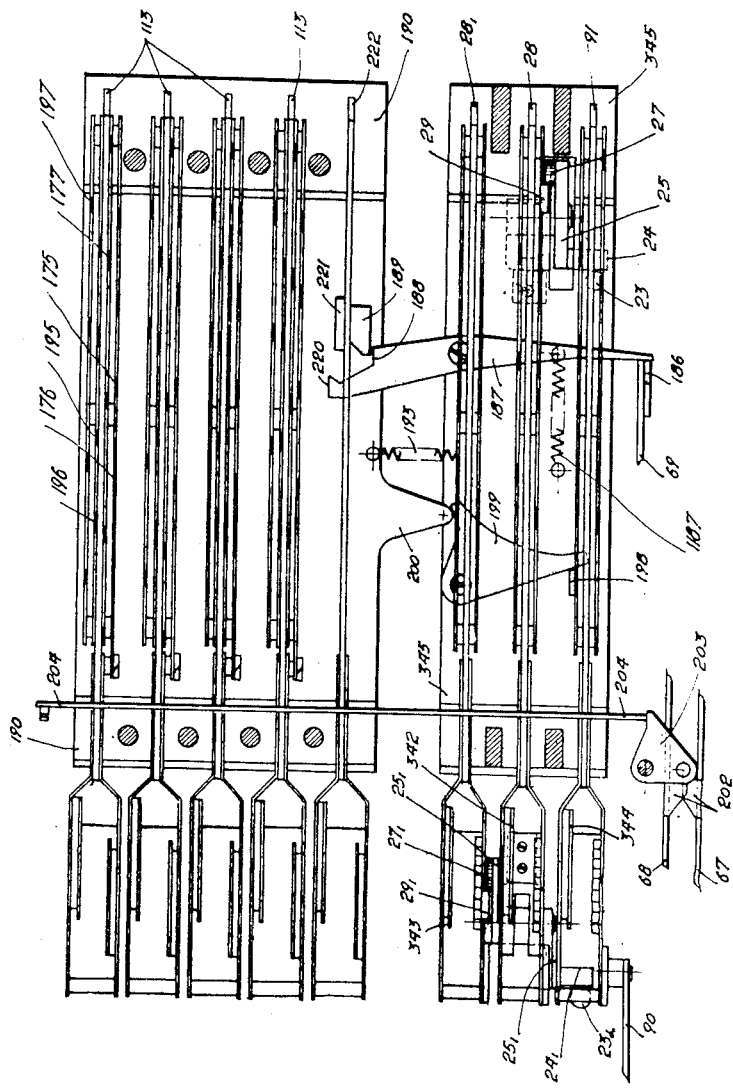

Sept. 11, 1956　　　　　　　F. CAMPOS　　　　　　2,762,561
CARRIAGE CONTROLS FOR CALCULATING MACHINE
Filed Nov. 15, 1954　　　　　　　　　　　　　　　　13 Sheets-Sheet 9
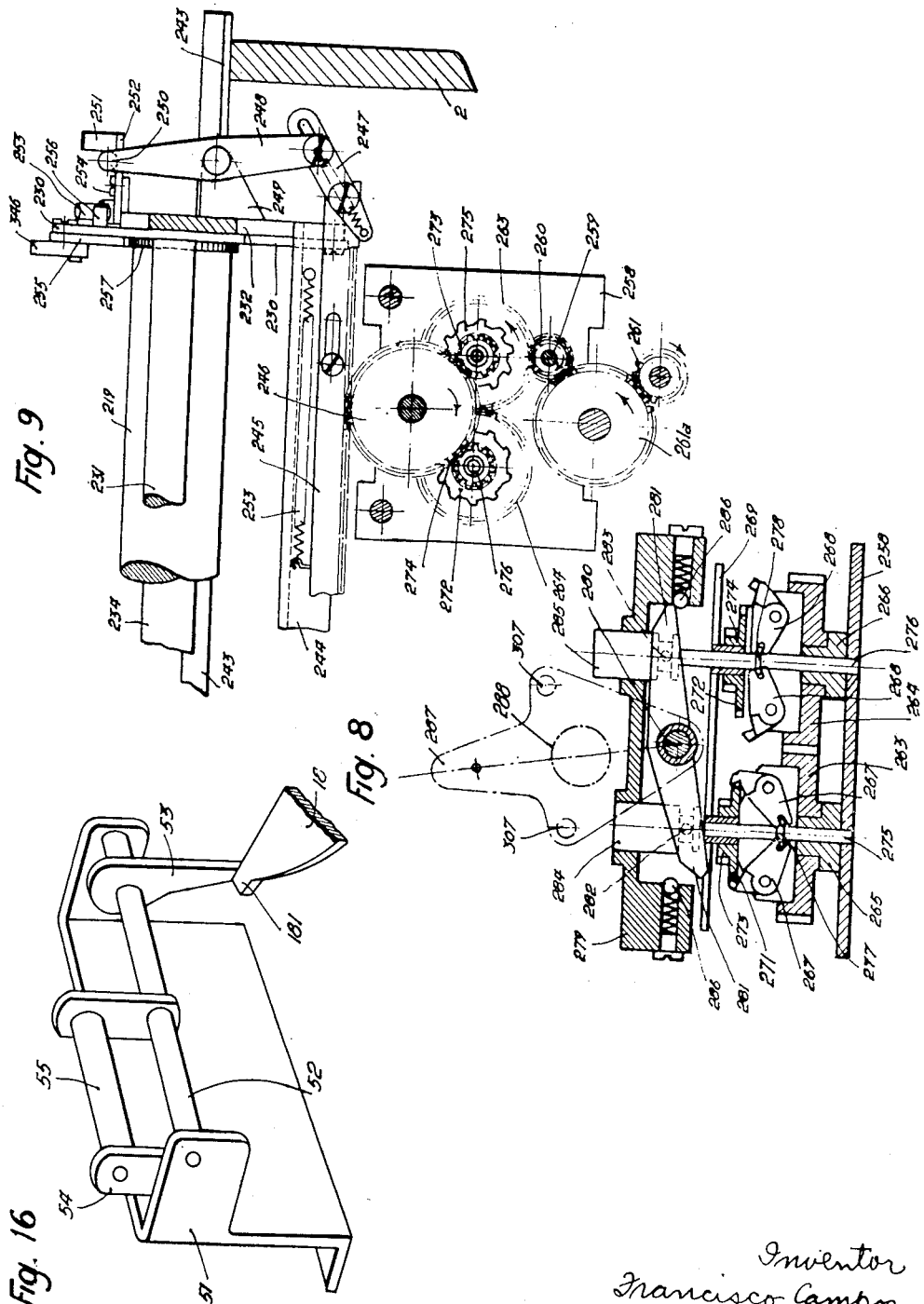
Inventor
Francisco Campos
By Allen + Allen
Attorneys Sept. 11, 1956  F. CAMPOS  2,762,561
CARRIAGE CONTROLS FOR CALCULATING MACHINE
Filed Nov. 15, 1954  13 Sheets-Sheet 10
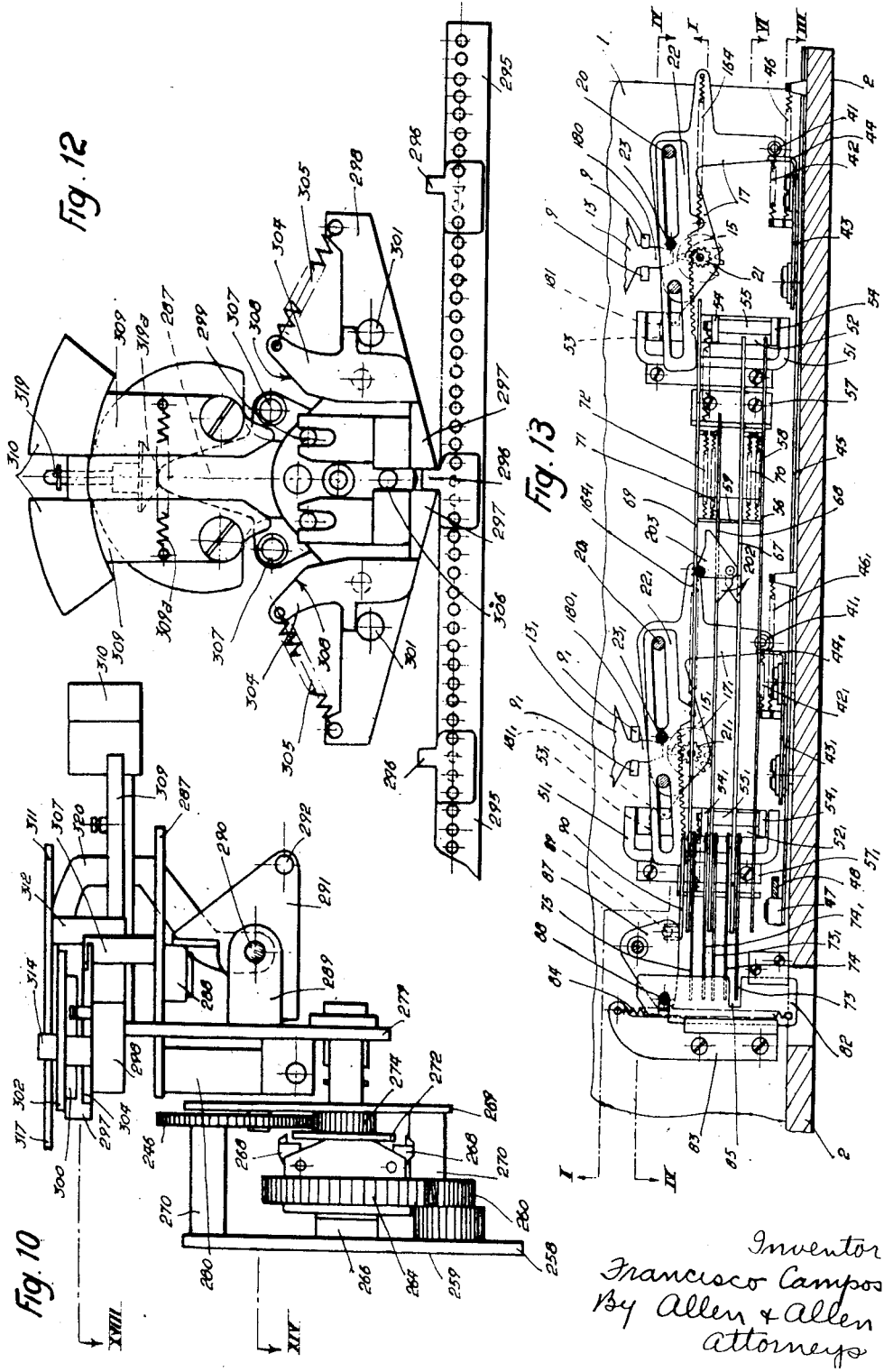
Inventor
Francisco Campos
By Allen & Allen
attorneys

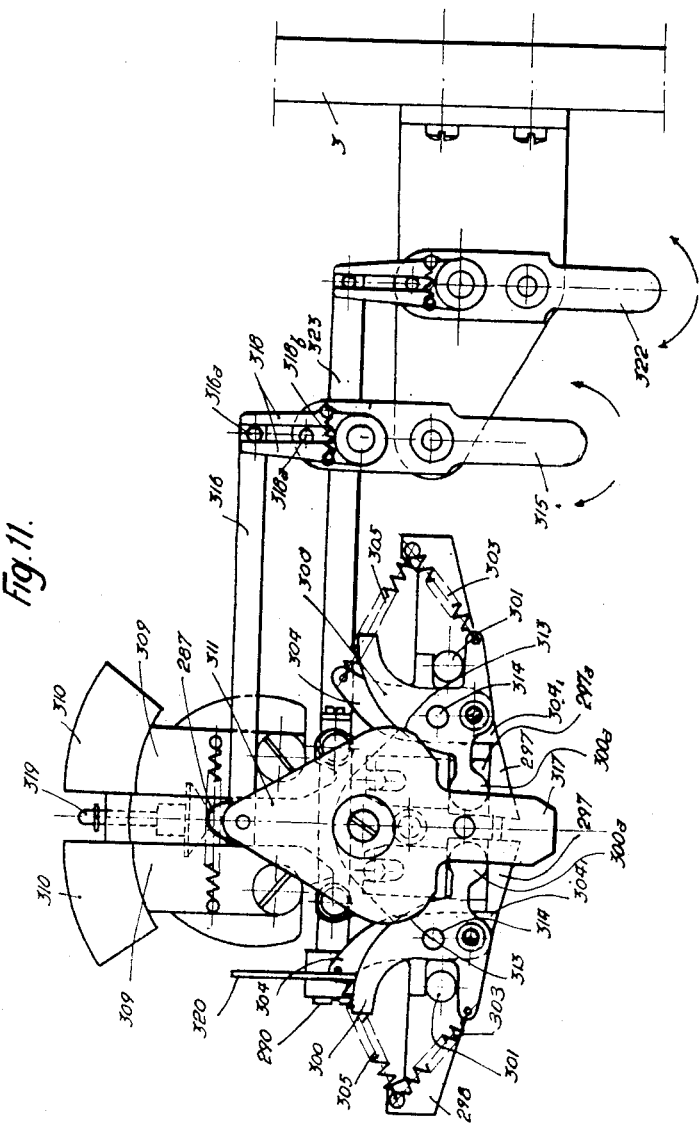

Sept. 11, 1956　　　　　F. CAMPOS　　　　　2,762,561
CARRIAGE CONTROLS FOR CALCULATING MACHINE
Filed Nov. 15, 1954　　　　　　　　　　　　13 Sheets-Sheet 12

Inventor
Francisco Campos
By Allen & Allen
attorneys

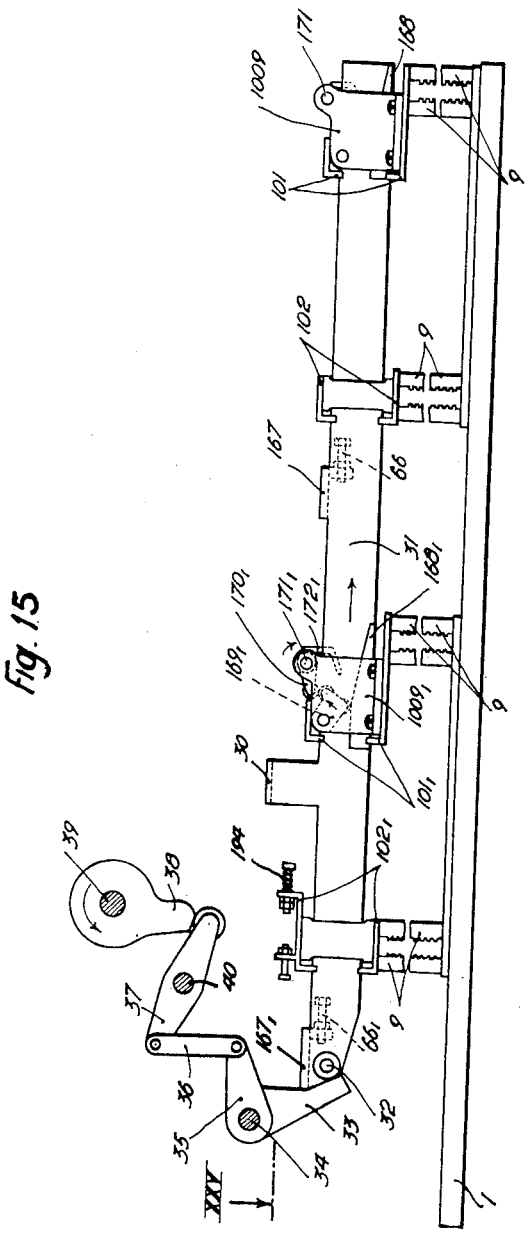

United States Patent Office 2,762,561
Patented Sept. 11, 1956

2,762,561

CARRIAGE CONTROLS FOR CALCULATING MACHINE

Francisco Campos, Paris, France, assignor to Societe des Brevets Logabax, Paris, France, a corporation of France Application November 15, 1954, Serial No. 468,968

Claims priority, application France February 12, 1951

1 Claim. (Cl. 235—60.48)

The present invention relates to calculating machines of the type described in my prior U. S. Patent No. 2,562,172, and this application is a continuation-in-part of my prior U. S. patent application, Ser. No. 211,596, filed February 19, 1951, now abandoned.

Machines of the considered type incorporate a certain number of totalizers or counting sections, each of said sections comprising a number of piled up counting frames adapted to slide laterally and individually and containing longitudinally extending, parallel slides in a number equal to that of the orders of numeration which it is desired to register in the machine. Each slide is provided, on one side, with a first series of notches and, on the other side, with a second series of notches. One fixed stop member, extending through all the piled up counting frames, is provided for each denomination and is adapted to cooperate, when a frame is moved laterally in one direction, with the above mentioned first series of notches of the slide in said frame, which belongs to the corresponding denomination. A number of movable angle members equal to that of the slides in each counting frame extend along each pile of counting slides through the piled up counting frames in each counting unit. Each of the said angle members is provided with a bent edge adapted to engage the second series of notches of the corresponding slide of a counting frame when the said frame is moved laterally in the direction opposite to that which has been mentioned hereabove. Each of the said angle members, with the exception of that which corresponds to the highest order of numeration, is adapted to be controlled by a driving bar, the longitudinal position of which is, in its turn, controlled by a stop bar cooperating with the keys of a keyboard. Means are provided to control the lateral movements of any desired counting frame in a counting section, and means are also provided to control the nature of the operations which are to be performed in the machine, such as addition, subtraction, totalization and sub-totalization.

The members operating the control of the lateral movements of the counting frames, which enables a given counting frame to be selected in any counting section, as well as the members operating the control of the nature of the operations which are to be performed comprise stop bars which are adapted to slide forwards and backwards in the machine and to be stopped in a given position by depressable keys of a control keyboard.

In the said machine, means are also provided to transfer the values represented by the position of the slides in a given frame to a common registering and printing mechanism, which comprises a printing roller mounted on a carriage adapted to be driven across the machine in one direction or the other and to be stopped in various positions of tabulation in which the printing takes place. Generally, the printing of the registrations operated in a given counting frame, as well as the results of the calculations performed by the machine, are printed respectively in given columns on a sheet of paper placed on the printing roller, each column corresponding to a given position of tabulation.

It is an object of the present invention to provide means for operating an automatic control of the selection of the counting frames and of the selection of the nature of the operations which are to be performed.

An embodiment of a machine according to the invention and comprising such means and the operation thereof are fully described hereinafter, reference being had to the drawings forming a part hereof and in which:

Fig. 3 is a partial sectional view on the line III of Fig. 13, showing the driving members for the control of the selection of counting units.

Fig. 4 is a lateral section on the line IV of Fig. 13 and showing the selecting members of the counting units and of the nature of the operations which are to be performed.

Fig. 5 is a partial horizontal section on the line V of Fig. 2 showing the rectilinear counting units of the machine.

Fig. 6 is a lateral view on the line VI of Fig. 13 showing the clutching members relating to the engagement of the counting units.

Fig. 7 is a partial horizontal section on the line VIII of Fig. 2, showing the disposition of the stop bars.

Fig. 8 is a horizontal section of the driving mechanism of the carrier, on line XIV of Fig. 10.

Fig. 9 is a vertical sectional view of the driving mechanism of the carriage on line XV of Fig. 1, as seen from the rear of the machine.

Fig. 10 is a side view of the driving mechanism of the carriage.

Fig. 11 is a plan view of the driving mechanism of the carrier, the cover having been removed.

Fig. 12 is a plan view of the driving mechanism of the carriage on line XVIII of Fig. 10.

Fig. 13 is a partial sectional view on line XX of Fig. 4, showing the selecting members of the counting units and of the nature of the operations which are to be performed.

Fig. 15 is a side elevational view of a sliding bar controlling the selection of the counting frames and Fig. 16 is a perspective view of a detail of the counting frame selection mechanism.

Figure 1:
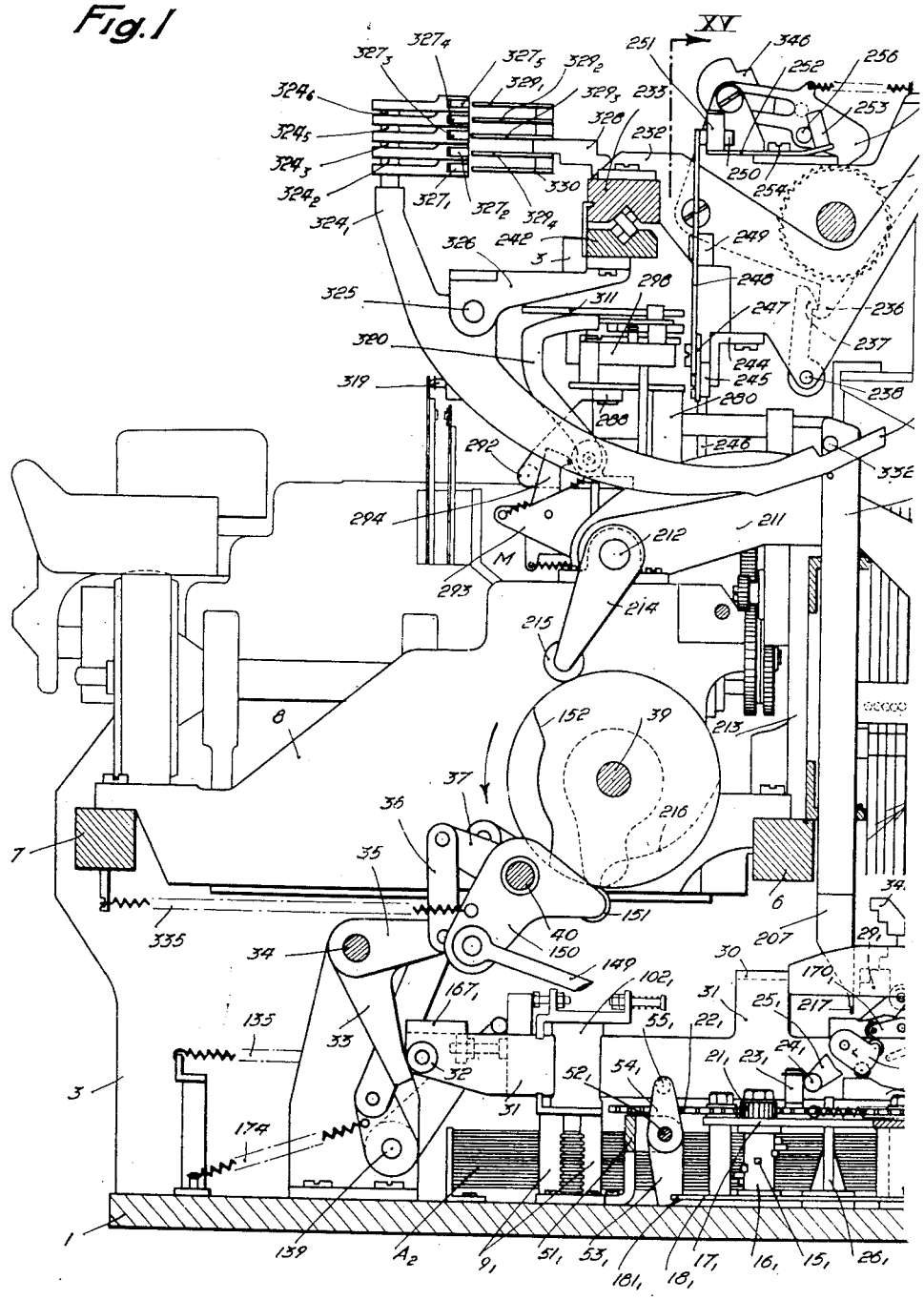
Fig. 1 is a general view of the rear part of the machine represented by a section on the line I—I of Fig. 13.

The machine as shown comprises a frame formed of a bottom plate 1 fast with two right and left plates 2 and 3, connected by square struts 4, 5, 6 and 7, and an intermediate plate 8 fixed to said square struts 6 and 7. On said frame are fixed all the mechanical elements of the machine, which are hereafter described.

The machine comprises (Figs. 1, 1a and 5) two counting sections $A_1$ and $A_2$, each including a certain number of counting units, said sections being hereafter respectively called "front section" and "rear section" for sake of simplicity.

In the following description and in the drawings, reference numerals without an index refer to the front section $A_1$, and generally to the corresponding control members, whereas reference numerals provided with index 1 refer to the rear section $A_2$, and generally to the corresponding control members.

Each section comprises vertical rack-posts 9 and $9_1$ (Figs. 1, 1a and 2, 2a) secured on plate 1 and provided with slots for slidably holding bars 10 and $10_1$ (Fig. 5) which are provided with studs 11 and $11_1$, such as described in my above mentioned U. S. Patent No. 2,562,172. Said studs 11 and $11_1$ act as guides for slides 12 which are adapted to move perpendicularly to bars 10, $10_1$. Flat, triangular members 13, $13_1$ are also slidable mounted in vertical racks $90_0$ and $900_1$, and the ends of said members engage studs 14 and $14_1$ provided on bars 10, $10_1$.

Springs 64 and $64_1$ maintain bars 10 and $10_1$ by pressing upon them (Fig. 5) so as to lock slides 12 by means of locking angle-bars 65 and $65_1$ which cooperate with teeth provided on one side of slides 12. Said locking action continues as long as the corresponding counting unit has not been selected.

In each section $A_1$ or $A_2$, there are nine piled up frames, hereafter called counting frames, formed of two bars 10 or $10_1$, carrying five slides 12, $12_1$, each corresponding to one order of numeration, and one triangular member 13, $13_1$.

Two shafts 16 and $16_1$ are rotatably mounted in upper plates 17 and $17_1$ and lower plates 18 and $18_1$ which are held parallel by means of sleeves 19 and $19_1$ (Figs. 1, 1a and 4) on which they are secured, said sleeves being rotatably mounted on trunnions 20 and $20_1$ (Figs. 1, 1a) secured on plate 1. Said shafts 16 and $16_1$ are provided with ten laterally extending pins 15, $15_1$, helically arranged around said shafts in such a manner that each pin 15, $15_1$ is on the same level as a nose 180, $180_1$ provided on each triangular member 13, $13_1$ Pinions 21 and $21_1$ are fixed on shafts 16 and $16_1$ (Fig. 13) and cooperate with racks 22 and $22_1$ mounted on the upper plates 17 and $17_1$, by means of longitudinal slots, the racks engage on the end of trunnions 20, $20_1$ and on trunnions secured at the opposite ends of plates 17, $17_1$. These racks are continually drawn towards the front of the machine by springs 164 and $164_1$, the other ends of which are secured on the plates 17 and $17_1$ (Figs. 1, 1a, 4 and 13).

The said racks 22 and $22_1$, slidably mounted on the plates 17 and $17_1$, are provided with rollers 23 and $23_1$ which cooperate with fingers 24 and $24_1$, fast with lever-arms 25 and $25_1$ (Figs. 1, 1a) and pivotally mounted on two supports 26 and $26_1$ fast with plate 1; the upper arms of said levers 25 and $25_1$ are provided with rollers 27 and $27_1$ which coperate with projections 29, $29_1$ provided laterally on stop bars 28 and $28_1$. Said stop bars 28 and $28_1$ (Figs. 1 and 7) slide in grooves provided inside a frame 345 rigidly connected to the struts 4 and 5.

As above mentioned, springs 164 and $164_1$ act upon racks 22 and $22_1$, drawing said racks and the rollers 23 and $23_1$ which are carried thereby towards the front of the machine. Said rollers 23 and $23_1$ act upon levers 25, $25_1$ and, in turn, the rollers 27, $27_1$, acting upon the lateral projections 29, $29_1$ of stop bars 28, $28_1$, tend to drive said bars towards the rear of the machine. Said stop bars 28, $28_1$ abut against a cross bar 30 rigidly connected at its respective ends with two parallel bars 31 and $31_1$ slidably mounted, on each side of, and above the units $A_1$ and $A_2$, in vertical guides 102, $102_1$ respectively carried by the vertical rack posts 9 and $9_1$. Bars 31 and $31_1$ are acted upon by spring 163 which tend to pull said bars toward the rear of the machine, this movement being opposed by the abutment of rollers 32 and $32_1$ carried by the rear part of said bars 31, $31_1$, against levers 33 and $33_1$ (Figs. 1, 1a, 2, 2a and 15). Said levers 33 and $33_1$ are keyed on a shaft 34 on which is secured an arm 35 connected by a rod 36 to a lever 37 rotatably mounted on a shaft 40 the ends of which are respectively secured to plates 2 and 8 of the machine. Said lever cooperates with a cam 38 keyed on a shaft 39 rotatably mounted on said plates 2 and 8 and rotated by the motor M of the machine, by means of a well known self clutching and un-clutching system E, such as, for example, that described in the above mentioned U. S. Patent No. 2,562,172, and visible in Fig. 2.

On an extension of plates 17 and $17_1$ are rotatably mounted rollers 41 and $41_1$ (Figs. 4 and 13) on the axle of which are hooked springs 42 and $42_1$ (Figs. 3, 6, 13, 14) secured, at their other ends, on slides 43 and $43_1$ provided with bent ends 44 and $44_1$ which are applied by said springs against rollers 41, $41_1$. Said slides 43 and $43_1$ are respectively slidably mounted on a bar 45, which is also slidably mounted on plate 2. Springs 46 and $46_1$ are hooked at one of their ends to plate 2 and at their other ends on slides 43 and $43_1$ and tend to drive said slides 43 and $43_1$ towards the front of the machine. A lever 48 (Fig. 3) maintains bar 45 rearwards, said bar acting against springs 46 and $46_1$ by means of a roller 47 fixed on said bar 45. Lever 48 is rotatably mounted on shaft 40 and carries a roller 49 which cooperates with a cam 50 keyed on shaft 39. On shafts 52 and $52_1$ rotatively mounted on supports 51 and $51_1$ (Figs. 1, 1a, 4, 13 and 16) are keyed arms 53 and $53_1$ which are intended for the purpose of locking the lower plates 18 and $18_1$ in one direction or in the other by acting on the noses 181 and $181_1$ of said plates 18 and $18_1$ (Figs. 1, 1a and 16), either when said plates 18 and $18_1$ are under the action of springs 46 and $46_1$ or when said plates 18 and $18_1$ are under the action of springs 42 and $42_1$ (Figs. 1, 1a, 3, 4, and 13) according to the position of cam 50 which determines whether or not lever 48 will displace bar 45 submitted to the action of springs 46 and $46_1$. On shafts 52 and $52_1$ are moreover keyed arms 54 and $54_1$, carrying rollers 55 and $55_1$ arranged for cooperation with sliding-bars 56, 67, 68, 69 (Figs. 4, 6 and 13) mounted on guides 57 and $57_1$ fixed on plate 1.

Bar 56 is held towards the rear of the machine against a stop 59 by means of a spring 58. Upon the rear end of said bar 56 acts a roller 60 carried by a lever 61 rotatably mounted on shaft 40 and having an upper arm 62 provided with a nose capable of cooperating alternately with teeth $63_1$ and $63_2$ provided on a cam 63 fast with shaft 39 (Fig. 6).

Bars 67, 68, 69, which also slide on guides 57 and $57_1$ are drawn rearwards by means of springs 70, 71 and 72 (Figs. 4 and 13). Bars 67 and 68 each carry, at one of their ends, two rocking levers 73, 74 and $73_1$, $74_1$ whereas bar 69 is provided with only one rocking lever 75 (Figs. 4 and 13). All these levers are pulled upwards by means of springs 76. These different levers are of identical shape, except for levers 73 and $73_1$ which extend in an upper arm 77 (Fig. 4). A lever 78 (Fig. 4) is rotatably mounted on shaft 40 and carries a roller 79 which cooperates with a cam 80 keyed on shaft 39. A plate 81 is rigidly connected to the lower arm of lever 78 and the dimensions of this plate are so chosen as to allow it to press at the same time upon all levers 73, $73_1$, 74, $74_1$ and 75 (Figs. 4 and 13) against the action of spring 76, when said lever 78 is released by cam 80 and plate 81 is pulled towards the rear of the machine by a spring 168 (Fig. 4).

A plate 82 (Figs. 4 and 13) slidably mounted in a guide 83 secured on the base plate 1 of the machine is under the action of a spring 84 which causes the said plate to be pulled towards the right hand side of the machine.

A notch 85 is provided in plate 82 in order that only one nose 86 of one of the levers 73 to 75 may pass through plate 82, according to the sliding position of said plate. On a vertical shaft extending from the base plate of the machine is rotatably mounted a two armed lever 87 one arm of which carries a roller 88 entering a suitable notch provided in plate 82. The other arm of said lever 87 carries a second roller 89 which cooperates with an extension 90 or a stop bar 91 (Figs. 4, 7 and 13) slidably mounted in the above mentioned frame 345.

The arms 77 provided on levers 73 and $73_1$ are adapted to cooperate with a roller 229 mounted at one end of a lever 227 which rotates on shaft 40. Said lever is applied by a spring 228 on a cam 226 keyed on shaft 39.

Each of the above mentioned levers 73, 74, $73_1$, $74_1$ and 75 is provided with a catch 185 adapted to come across the path of plate 81 when said levers are allowed to rise through the notch 85 in plate 82.

As in the above mentioned U. S. Patent No. 2,562,172, a keyboard is provided for the control of the machine, which comprises three different series of keys, viz. one row of six keys $92_1$ through $92_6$, two parallel rows of nine keys $93_1$ to $93_9$, and four rows of nine keys 114 (Figs. 1, 1a, 2, 2a, 4 and 14).

The keys in the right and left hand rows of keys $93_1$ to $93_9$, which are adapted to be depressed and held in depressed position as fully described in my co-pending application Serial No. 211,595 filed February 19, 1951, now Patent No. 2,705,109, respectively cooperate, when depressed, with teeth 165 provided on the stop bar $28_1$ and with teeth 166 provided on stop bar 28, the right hand row of keys 93 controlling the front counting section $A_1$ and the left hand row controlling the rear counting section $A_2$, each key in one row corresponding to one of the counting frames in the corresponding section.

Figure 2:
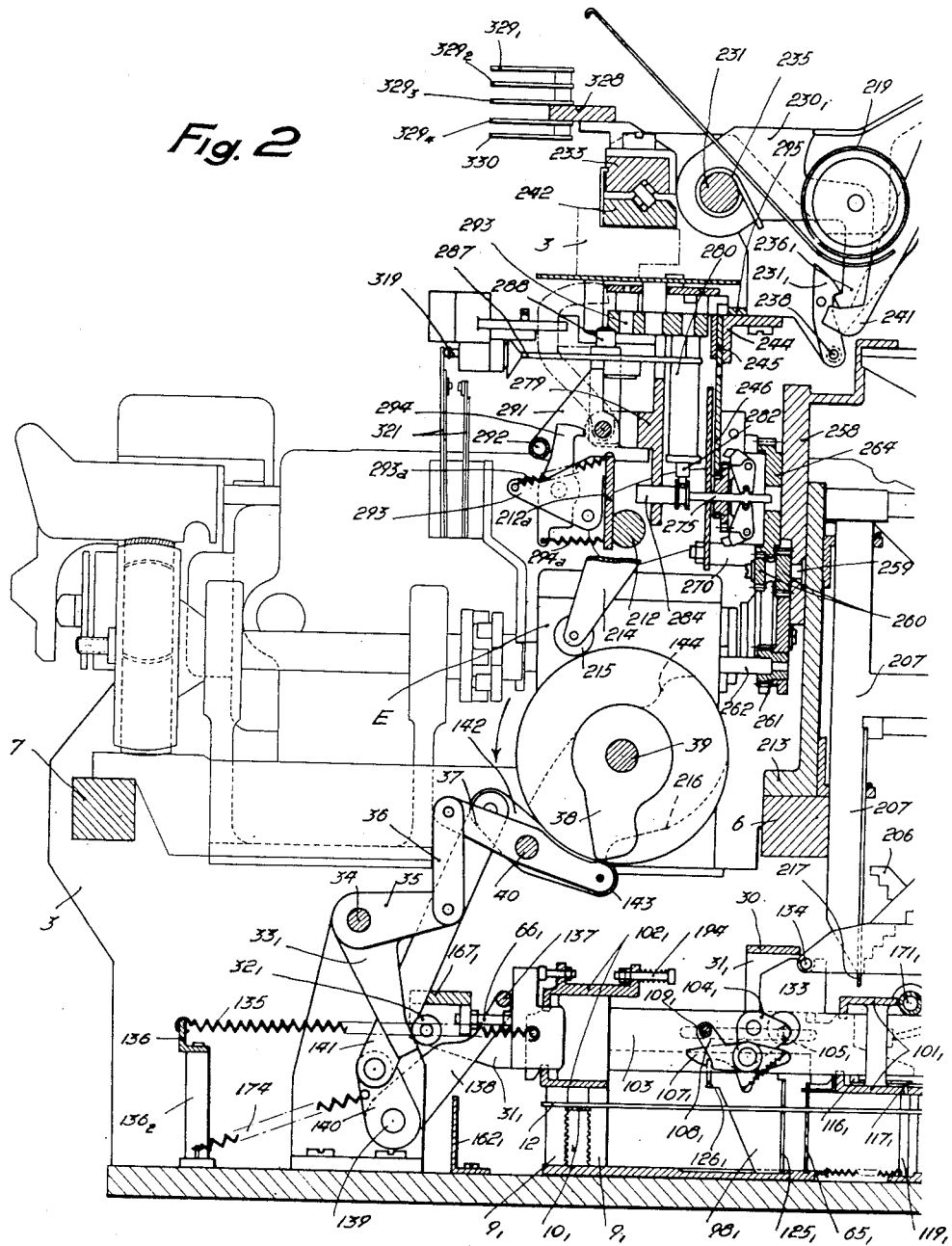
Fig. 2 is a general view of the rear part of the machine represented by a section parallel to that of Figs. 1 and 1a but in a plane passing through the middle of the machine.

As may be seen from Figs. 2 and 5, driving angle bars 98, $98_1$ which extend vertically through the piled up counting frames on the side of each pile of slides 12, $12_1$ opposite to that cooperating with the locking angle-bars 65—$65_1$, are provided for cooperation with teeth provided in said slides when the corresponding counting frame is moved laterally against the action of springs 64, $64_1$. The said angle bars 98, $98_1$ are adapted to move forwards and backwards under the control of various sliding members controlled by the keys 114 of the keyboard the construction and operation of which said sliding members being fully described in my copending application Ser. No. 211,594 filed February 19, 1951, now Patent 2,702,670, and to drive correspondingly the slides 12 with which they are engaged, through distances corresponding to the values represented by the keys 114 which have been depressed.

Among the sliding members which control the movements of driving means 98 and $98_1$ are a number of stop bars 113 adapted to cooperate with the rods 155 of keys 114 when said keys are depressed. Said stop bars, in the same manner as the corresponding bars in the machine described in my U. S. Patent No. 2,562,172, comprise four parallel blades (Figs. 2 and 7) provided on their upper side with teeth which are in staggered relation with one another. The teeth on the two left hand blades of each stop bar 113, such as teeth 175, 176 and 177 correspond to addition, and are spaced longitudinally in such a manner that the movement of a stop bar 113 before such a tooth comes in abutment against the rod of a depressed key 114, is proportional to the value represented by the depressed key. The longitudinal arrangement and spacing of the teeth on the two right hand blades of each stop bar 113, such as teeth 195, 196 and 197, are such that the movement of a stop bar 113 before it is stopped because of the abutment of such a tooth against the rod of a depressed key 114, is proportional to the complement to 9 of the value represented by the depressed key.

The stop bars 113 are slidably mounted on a frame 190 which is suspended by means of two rods 191 and 192 rotatably mounted on struts 4 and 5, respectively, and depending therefrom (Fig. 2), a spring 193 (Fig. 7) being arranged to urge said frame continuously towards the left hand side of the machine, that is towards the frame 345 which slidably supports stop bars 28 and $28_1$.

The above mentioned bar 69 to which is connected lever 75 is provided, at its end opposite to that which carries said lever, with an upwardly protruding nose 186 (Figs. 4 and 7) adapted to cooperate with one end of a horizontal lever 187, oscillatably mounted on frame 345. The other end of lever 187, which extends across frame 345 and over frame 190, is provided with a shoulder 188 which cooperates with a latch block 189 secured on frame 190 and normally applied against said shoulder 188 by spring 193.

On the other hand, stop-bar 91 which cooperates with the row of keys 92 of the keyboard carries a downwardly protruding projection 198 (Fig. 7) which is adapted to engage one end of a lever 199 rotatably mounted on frame 345, the other end of which is adapted to exert a pressure, when rotated in a counterclockwise direction, from a nose 200 extending laterally on frame 190.

The two bars 67 and 68, to which are connected levers 73, 74 and $73_1$, $74_1$, respectively, are each provided with a lateral angle member 202. The said two angle members 202 respectively face each other and both cooperate with a stud secured on the lower face of a triangular plate 203 which rotates on a trunnion secured on square strut 5 (Fig. 7) and on one side of which comes in abutment a transverse slide 204 extending across and under the keyboard and adapted to cause all the keys 114 to be released and raised as described in my above mentioned Patent No. 2,705,109.

The above described members are adapted to allow, on one hand, by means of the keys 93 of the keyboard, the selection of a given counting frame in counting sections $A_1$ or $A_2$, for the purpose of registering calculation data in said counter, and, on the other hand, by means of the keys 92 of the keyboard, the selection and control of the nature of the calculating operation which is to be performed by the machine, to wit: addition, subtraction, totalization, that is to say the transfer of the amount registered in a counting frame of one section to a counting frame of the other section, the slides 12 or $12_1$ in the first mentioned counting frame being all brought back to their extreme rearward position, and sub-totalization, that is to say the same transfer as above mentioned, the slides 12 or $12_1$ in the first counting frame being brought back to the position which they occupied at the beginning of said operation. The keys $92_1$ to $92_5$ correspond to the said selection of the nature of the operation to be performed, viz: $92_1$, marked $ST_{av}$, and $92_3$, marked $ST_{ar}$, for the sub-totalization in the front section $A_1$ and rear section $A_2$, respectively, $92_2$ and $92_4$, marked $T_{av}$ and $T_{ar}$, for the totalization of the same respective sections, and key $92_5$, marked S, for subtraction.

SELECTION OF COUNTING FRAMES

In order to select a given counting frame or counter in a counting section $A_1$ or $A_2$, for the purpose of registering calculation data in said counter, the operator depresses one of keys $93_1$ to $93_9$ of the left or right hand row of keys, respectively, which corresponds to the frame which is to be selected in the corresponding section, for example key $93_4$ of the left hand row of keys 93 corresponding to the front section $A_1$ of the machine, and key $93_5$ of the right hand row of keys 93 corresponding to the rear section $A_2$ of the machine. The motor is then started and shaft 39 is driven through the self clutching and unclutching device to make one revolution and thus carry out one cycle of operations.

In considering Fig. 3, it may be seen that cam 50, keyed on shaft 39, will exert a pressure upon roller 49, thus causing lever 48 to rock around shaft 40, which lever will, in turn, exert a pressure upon roller 47, causing bar 45 to slide towards the rear of the machine, thus driving in the same direction the slides 43 and $43_1$ against the action of springs 42 and $42_1$. Springs 42 and $42_1$ are thus tensioned and pull on supporting plates 17 and $17_1$.

However, said support plates 17 and $17_1$ will be prevented from rocking, since the other parallel support plates 18 and $18_1$ (Figs. 1, 1a, 4, 13 and 16) are locked by locking members 53 and $53_1$.

Figure 1A:
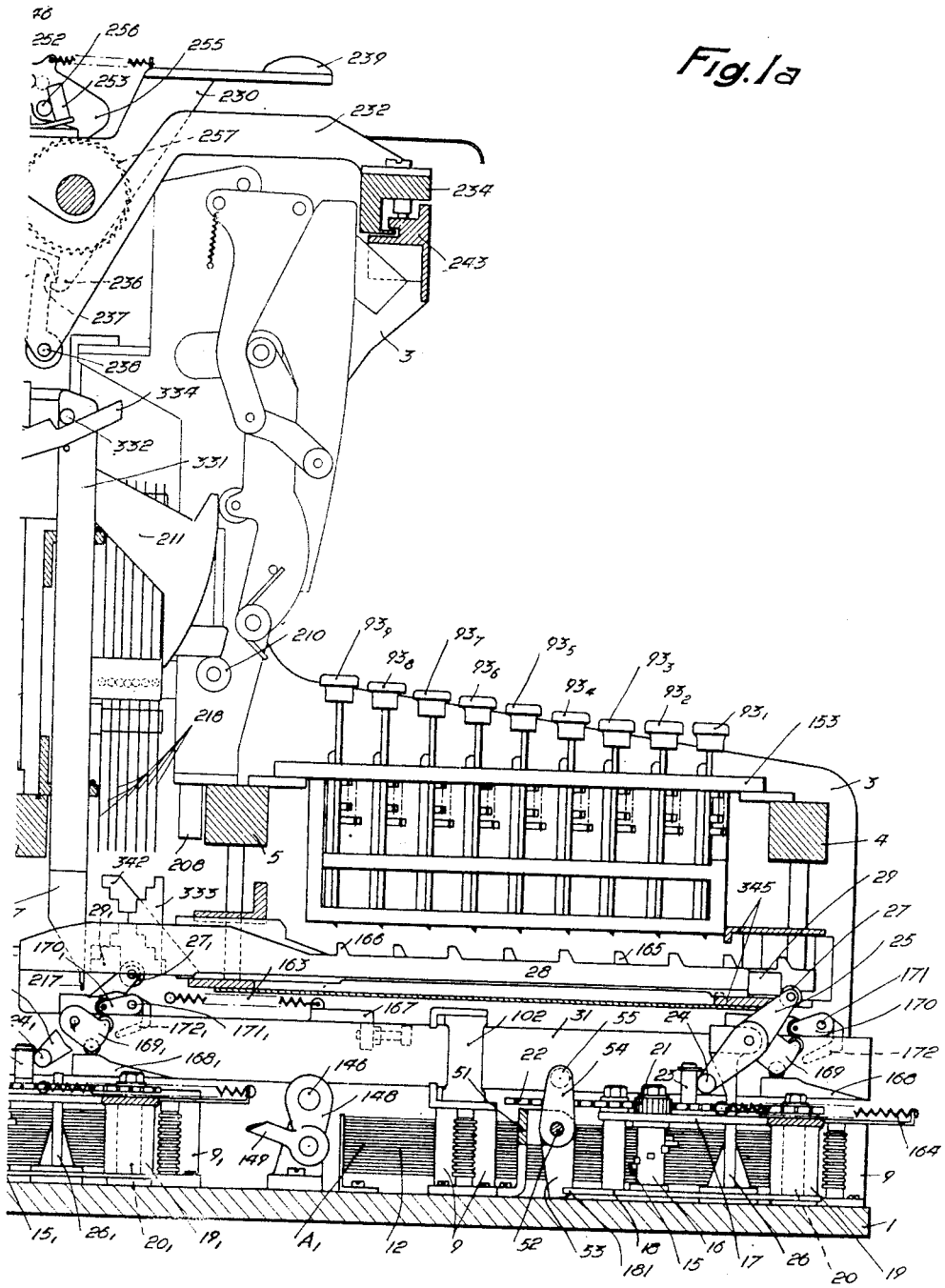
Fig. 1a is a similar view of the front part of the machine.

At the same time, cam 38 (Figs. 2 and 15) will release lever 37, which allows the movement of link 36, of lever 35 mounted on shaft 34 and of levers 33 and $33_1$, whereby bars 31 and $31_1$ will slide towards the rear of the machine, under the action of springs 163 (Figs. 1 and 2).

Cross bars 30 (Figs. 1, 2 and 15) will also move backwards, thus releasing the ends of stop bars 28, $28_1$, respectively, which are now free to move also toward the back of the machine.

As above described, springs 164 and $164_1$ respectively pull forwards the racks 22 and $22_1$ which carry fingers 23, $23_1$ acting upon levers 25, $25_1$. The said levers therefore tend to rock and to push stop bars 28, $28_1$, by means of rollers 27, $27_1$ and projections 29, $29_1$. The said bars 28, $28_1$ which have now been released will therefore move toward the back of the machine, but their movement will be stopped when a tooth 165 or 166 of said bars 28, $28_1$, comes to abut against the rod of the key 93 which has been depressed in the corresponding row.

At the same time racks 22, $22_1$ cause corresponding pinions 21, $21_1$, respectively keyed on shafts 16, $16_1$, to rotate as long as stop bars 28, $28_1$ move towards the back of the machine. The diameter of said pinions and the position of teeth 165 and 166 on stop bars 28, $28_1$ are predetermined in order that, when a key 93 has been depressed in each row, and the machine started, the corresponding possible backward movement of stop bars 28, $28_1$, and therefore the forward movement of racks 22, $22_1$ causes such a rotation of shafts 16, $16_1$ that the fingers 15, $15_1$ carried by said shafts, which are at the level of the counting frames corresponding to the keys which have been depressed, are brought in front of the noses 180, $180_1$ of the triangular members 13, $13_1$ of said counting frames. Thus, in the example which has been chosen, a tooth 165 of bar 28 is stopped by the rod of key $93_4$ of the left hand row of keys 93, and a finger 15 of shaft 16 is brought in front of the nose 180 of the counting frame No. 4 of the section $A_1$, whereas a tooth 166 of bar $28_1$ is stopped by the rod of key $93_5$ of the right hand row of keys 93 and a finger $15_1$ of shaft $16_1$ is brought in front of the nose $180_1$ of the counting frame No. 5 of section $A_2$.

The preparation for selecting the counting frame is thus operated. The unlocking of slides 12 corresponding to said counting frames, as well as their engagement with the angle bars 98 and $98_1$, of the driving and calculating means, will now be described.

Shaft 39 continuing its rotation (Fig. 6), tooth $63_1$ of cam 63 engages under the nose of lever 62, thereby driving lever 61 which, by means of roller 60 causes bar 56 to slide towards the front of the machine, against the action of spring 58.

Bar 56 will simultaneously exert a pressure upon rollers 55 and $55_1$, thus unlocking plates 18 and $18_1$ through rotation of levers 53, $53_1$ (Figs. 1, 1a, 4 and 6). At this moment, the units composed of plates 17 and $17_1$, 18 and $18_1$, and shafts 16 and $16_1$ provided with fingers 15 and $15_1$, will rock about shafts 20, $20_1$ (Fig. 13) under the action of springs 42 and $42_1$ (Fig. 3) and fingers 15 and $15_1$ which are opposite triangles 13 and $13_1$ (Fig. 5) corresponding to the selected counting frame, will exert a pressure on said triangles.

Figure 2A:
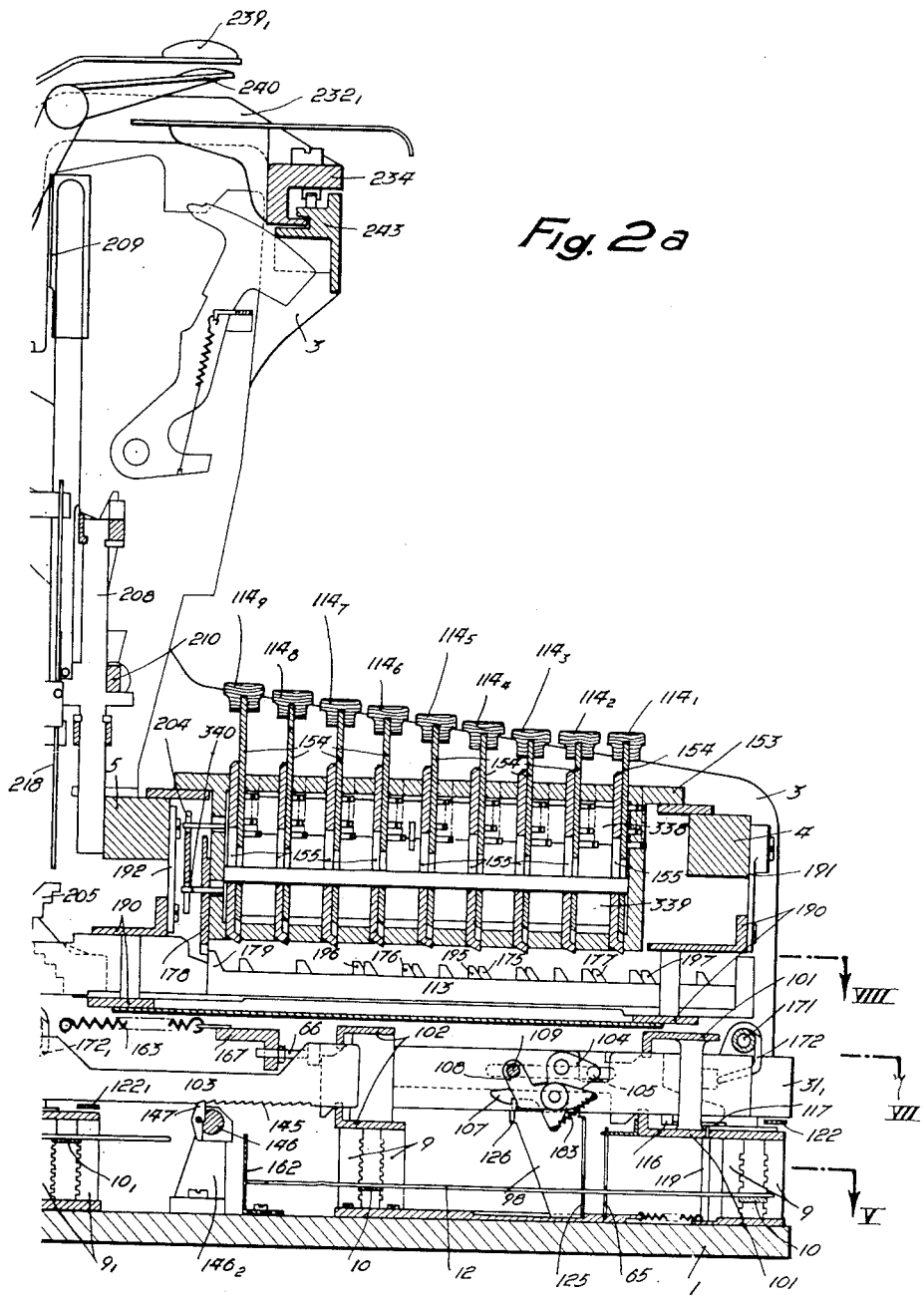
Fig. 2a is a similar view of the front part of the machine.

Bars 10 and $10_1$ will slide, against the action of springs 64 and $64_1$, thus releasing slides 12 from the locking bars 65 and $65_1$ and engaging said slides 12 with the angle-bars 98 and $98_1$ (Figs. 2, 2a and 5).

As soon as, in the rotation of cam 63, tooth $63_1$ of said cam releases lever 62, bar 56 slides back to its original position under the action of spring 58, and levers 53, $53_1$ are also released and engage again the noses 181, $181_1$ of plates 18, $18_1$, but on the other side, thus locking the counting frames which have been moved laterally.

The operations of registration and of calculation may then be carried out in the said counting frame, as is described in my above mentioned Patent No. 2,702,670.

When the machine is about to complete its cycle, corresponding to one rotation of shaft 39, cam 50 releases roller 49 and, by means of the same connections as hereabove described bar 45 will be free to return towards the front of the machine while slides 43 and $43_1$ will continue to exert a pressure, under the action of springs 46 and $46_1$, upon rollers 41 and $41_1$. However said pressure will not cause the unit, composed of plates 17 and $17_1$, 18 and $18_1$ to rock since, as above mentioned, the locking levers 53 and $53_1$ lock noses 181 and $181_1$ of plates 18 and $18_1$.

After this, tooth $63_2$ of cam 63 comes into cooperation with lever 62 and causes the same to rock and, by means of lever 61 and roller 60, to push back bar 56 which causes a further rocking of rollers 55 and $55_1$ carried by levers 54 and $54_1$, as well as of shafts 52 and $52_1$ and of locking levers 53 and $53_1$ (Figs. 1, 4 and 16). The rocking of locking levers 53 and $53_1$ releases plates 18 and $18_1$. Said plates, together with plates 17, $17_1$ and shafts 16, $16_1$ rock back under the action of springs 46, $46_1$. Fingers 15 and $15_1$ of shafts 16 and $16_1$, which cooperated with noses 180 and $180_1$ of counting units No. 4 of the front section and No. 5 of the rear section no longer act on said noses, and triangles 13 and $13_1$ are released. Corresponding springs 64 and $64_1$ push back the said counting units and the slides 12 thereof are disengaged from the mobile angle members 98, $98_1$ and engage with the fixed angle members 65 and $65_1$ under the action of springs 64 and $64_1$ (Fig. 5). As soon as the above mentioned tooth $63_2$ of cam 63 abandons lever 62, bar 56 is released and slides back to its original position, and the levers 53, $53_1$ once more engage the noses 181, $181_1$, of plates 18, $18_1$, respectively, thereby locking the said plates, together with shafts 19, $19_1$, in their original, inactive position.

Finally, cam 38 acts again upon lever 37, which, by means of link 36, lifts lever 35. Shaft 34 is thus rotated counterclockwise (Fig. 15) and the levers 33 and $33_1$ push on the rollers 32 and $32_1$, thereby causing a forward sliding of bars 31 and $31_1$. At this moment, cross bar 30 (Figs. 2 and 15) drives stop bars 28 and $28_1$ (Figs. 1, 1a and 4) forward, against the action of springs 84, 164 and $164_1$, respectively. Said stop bars therefore return to their resting position. Shaft 39 having performed a full rotation will be stopped by the self-unclutching device E, and the machine is ready to record a new operation.

CONTROL OF THE NATURE OF OPERATIONS

Addition

In order to perform an addition, no key 92 needs to be depressed.

At the same time as it has released bars 28 and $28_1$, cam 38 releases stop bar 91 (Figs. 1 and 4) which is then driven towards the rear of the machine under the action of spring 84 (Figs. 4 and 13) and that of cooperating members 82, 87 and 90. Since the operator has not depressed any function key 92, stop bar 91 (Fig. 4) will slide freely until it has reached its extreme position towards the rear of the machine and plate 82 provided with notch 85 will also slide until it has reached its extreme position towards the right hand side of the machine, covering levers 73, $73_1$, 74, $74_1$ and 75 which are thus prevented from rising and therefore remain without action on the members which they control. More particularly, the movable frame 190 carrying the stop bars 113 remains at rest towards the right hand side of the machine, and the teeth of the two left hand side blades of each stop bar 113 can cooperate with the rods of the corresponding keys 114 when such keys are depressed, the movements imparted to the corresponding calculating slides 12, $12_1$ of the selected counting frames are therefore proportional to the values represented by the depressed keys 114, if any.

When the cycle of the machine is about to be completed, bar 91 is returned to its original position at the same time as bars 28 and 28₁.

Subtraction

In order to perform a subtraction, apart from depressing the keys 93 corresponding to the counting frame or frames which are to be selected and the keys 114 corresponding to the number which is to be subtracted or registered as a negative amount, the operator depresses key 92₅.

The motor having been started, the cycle of the machine develops in the same manner as above described, as far as concerns the selection of the counting frames and the releasing of stop bar 91. However, key 92₅ having been depressed, the tooth 184 provided on said stop bar comes in abutment with the lower end of the rod of said key, and the movement of said bar is therefore stopped. Consequently, the fork of stop bar 90 holds back stud 89 carried by lever 87. The stud 88 carried by the same lever then prevents plate 82 from pursuing the movement which had begun under the action of spring 84, and notch 85 in said plate 82 presents itself over lever 75 which is then released and free to move upwards under the action of spring 76.

As shaft 39 rotates, cam 80 acts upon roller 79 of lever 78, which rotates clockwise (Fig. 4) around shaft 40, causing plate 81, fast with lever 78, to cease to bear upon levers 73, 74 and 75. Lever 75, which has been previously freed by the movement of plate 82, then rises under the action of spring 76 and its nose 185 comes into the path of plate 81. In its further movement under the action of cam 80, plate 81 comes into contact with the said nose 185 and pushes lever 75 towards the front of the machine. Bar 69, to which lever 75 is connected, moves in the same direction and the nose 186 thereof (Figs. 4 and 7) causes the rocking of horizontal lever 187, rotatably mounted on frame 345 which carries the stop bars 28, 28₁. The shoulder 188 of said lever 187 liberates latch block 189 and frame 190 is shifted laterally towards the left hand side of the machine under the action of spring 193. In this manner, the right hand blades of stop bars 113, instead of the left hand blades, are brought into a position in which they can cooperate with the rods of the depressed keys 114. The movements of the corresponding slides 12 in the selected counting frames will therefore each be proportional to the complement to nine of the value represented by the depressed key 114 and the machine will perform a subtraction, as fully explained in my above mentioned Patent No. 2,702,670.

In the last part of the operating cycle of the machine, cam 80 releases lever 78, plate 81 releases lever 75 and pushes it down, bar 69 being returned to its original position by spring 72. At the same time, stop bar 91 is pushed back to its original position, as above described. Plate 82 is shifted laterally and again covers lever 75, and the extension 198 carried by said bar 91 causes lever 199 to tilt and to push back frame 190 by means of nose 200, against the action of spring 193. At the same time lever 187 is pulled back by spring 1187 and the shoulder 188 of said lever engages block 189, thus locking frame 190 in its initial position.

Totalization-transfer

In order to perform a totalization-transfer operation, the operator depresses the keys 93 of the keyboard which correspond respectively to the counting unit of one section which is to be totalized and to the counting unit of the other section to which the totalized amount is to be transferred. He also depresses key 92₂ or 92₄ according to the section containing the unit which is to be totalized. As an example, it will now be supposed that totalization is to take place in counting frame No. 4 of the front section A₁ and the amount is to be transferred to counting frame No. 9 of the rear section A₂. The operator therefore depresses key 93₄ in the left hand row, key 93₉ in the right hand row and key 92₂.

The successive operations which are to be performed, as far as concerns the control of the selected counting units, are, in a first phase, the engagement with the mobile angle members 98 of the slides 12 of the counting frame No. 4 of the front section A₁ alone, the slide 12 of the counting frame No. 9 of the rear section A₂ remaining engaged with the fixed angle members 65₁, then, in a second phase, the engagement of the slides 12 of said counting frame No. 9 of the rear section A₂ with the mobile angle members 98₁, thereafter, in a third phase, the disengagement from members 98 of the slides 12 of said counting frame No. 4 and finally, in a fourth phase, the disengagement from members 98, of the slides 12 of said counting frame No. 9.

The motor being started, cam 38 releases bars 28, 28₁ and 91. As above described, bars 28 and 28₁ are stopped by the depressed keys 93₄ and 93₉, respectively, the springs 42 and 42₁ acting upon plates 17 and 17₁ are tensioned and shafts 16 and 16₁ are rotated in order to bring finger 15 in front of the nose 180 of counting frame No. 4 of section A₁ and a finger 15₁ in front of the nose of counting frame No. 9 of section A₂.

In the rearward movement of stop bar 91, the tooth 225 on said bar is stopped by the rod of the depressed key 92₂, and plate 87, which is rotated by said stop bar, is also stopped, after having rotated through such an angle that notch 85 of plate 82 comes above lever 74.

On the other hand, cam 80 causes the rocking of plate 81, which liberates lever 74. Said lever rises through notch 85 of plate 82, whereafter plate 81 engages nose 185 of said lever and pushes said lever, together with bar 67 to which it is connected, towards the front of the machine. Bar 67 presses on roller 55, which causes the rotation of locking member 53 and the releasing of nose 181 of plate 18. Spring 42 having been previously tensioned, the plates 17 and 18, together with shaft 16, rotate and cause counting unit No. 4 of section A₁ to be laterally shifted by the finger 15 which pushes on the nose 180 thereof. The slides 12 of said counting unit are thus disengaged from the fixed angle members 65 and engage the movable angle members 98.

During the forward movement of bar 67, the angle member 202 (Figs. 7 and 13) secured thereon pushes triangular plate 203 which rotates and causes slide 204 to be shifted laterally, thereby causing the releasing of all keys 114 which could have been depressed by mistake. The said releasing of keys 114, which does not form a part of the invention and is therefore not described in detail, is intended to avoid any possible external registration in the counting frames during the totalizing transfer operation.

The said operation is performed in a manner similar to that which is described in my U. S. Patent No. 2,562,172, as far as the movements of the slides 12, 12₁ and of the control members of said slides are concerned. These movements also do not form a part of the invention and will also not be described.

In a second phase, once the slides 12 of counting unit No. 4 have performed the necessary movements, being driven by the mobile angle bars 98 with which they were engaged, tooth 63₁ of cam 63 pushes lever 62, which liberates nose 181₁ of plate 18₁ to be unlocked, counting unit No. 9 of rear section A₁ thus being shifted as already described and the slides 12₁ thereof being disengaged from the fixed angle members 65₁ and engaged with the movable angle members 98₁.

During a third phase, cam 50, which had previously caused lever 48 to rotate and drive bar 45 rearwards while tensioning springs 42, 42₁ and 46, 46₁, releases said lever 48. Springs 46 and 46₁ tend to drive slides 43 and 43₁ forwards. Slide 43 presses on roller 41, which causes plates 17 and 18 to rock back, this movement being made possible by the fact that locking member 53, previously rotated by bar 67, has not yet returned to its initial position in which it would have locked plate 18. The rocking back of plates 17 and 18, together with shaft 16, liberates counting frame No. 4 of front section $A_1$ and said counting frame moves back under the section of the corresponding spring 64, the slides 12 of said counting unit being thus disengaged from the movable angle members 98 and engaged with the fixed angle members 65.

In a fourth phase, before which the necessary movements have been communicated to the slides $12_1$ of counting unit No. 9 of the rear section $A_2$, by the control members thereof, tooth $63_2$ of cam 63 engages lever 62, which causes counting unit No. 9 of rear section $A_2$ to shift back under the action of the corresponding springs $64_1$, as has been previously described, the slides 12 of said counting unit being thus disengaged from the movable angle members 98 and engaged with the fixed angle members $65_1$.

Finally, all the control members for the selection of counting units and of the totalization-transfer operation are brought back to their original position as already described.

*Sub-totalization-transfer*

In order to perform this operation, the operator, as previously depresses the keys 93 of the keyboard which correspond respectively to the counting unit of one section which is to be totalized and to the counting unit of the other section to which the totalized amount is to be transferred, and he also depresses key $92_1$ or $92_3$ according to the section containing the unit which is to be sub-totalized. As an example it will be supposed that the operator depresses keys $93_4$ in the left hand row and $93_9$ in the right hand row, as in the previous example, and key $92_2$.

The successive operations which are to be performed are the same as in the case of totalization, with the only difference that, instead of causing counting frame No. 4 of the front unit to move back to its original position before the slides $12_1$ in counting frame No. 9 of the rear section have performed the necessary movements and the said counting frame No. 9 is moved back to its original position, both said frames are moved back together, after the said movements of slides $12_1$ have been performed, which results in the slides 12 in frame No. 4 performing the same movements as the said slides $12_1$.

This is obtained as a result of stop bar 91 being stopped by the rod of key $92_1$ in such a position that notch 85 of plate 82 stops above lever 73, which therefore rises when it is liberated by the rocking of plate 81. The lever 67 is then pushed back as previously described, which causes the shifting of counting frame No. 4 of the front unit, at the desired moment, as in the case of totalization. The shifting of counting unit No. 9 of the rear unit is also performed in the same manner as for totalization.

In the forward movement of stop bar 91, the arm 77 provided on lever 73 comes into the path of roller 229 carried by lever 227. Before the third phase of totalization occurs, cam 226 pushes lever 227 downwards and roller 229 presses upon arm 77, forcing down lever 73. The nose 185 of said lever 73 escapes from plate 81 and spring 70 draws back bar 67 which releases locking member 53. Said locking member engages behind nose 181 of plate 18 and therefore locks the said plate in the position which corresponds to the shifting of counting frame No. 4 of the front unit. As a consequence, the shifting back of said frame during the third phase of totalization is made impossible and the slides 12 of said counting frame No. 4 remain engaged with the movable angle members 98.

The shifting back of said counting frame will take place together with that of counting frame No. 9 of rear section $A_2$, when tooth $63_2$ of cam 63 acts upon lever 62, as above described.

It may easily be seen that, if a counting frame of the rear unit $A_2$ is to be totalized or sub-totalized instead of a counting frame of the front unit $A_1$, and that the operator consequently depresses keys $92_4$ or $92_3$ instead of keys $92_2$ or $92_1$, respectively, the same movements will take place, except that levers $74_1$ or $73_1$ will be made active instead of levers 74 or 73, respectively, and that the order of the movements of the counting frames of the front and rear section, respectively, will be reversed.

PRINTING-CONTROL OF THE PRINTING ROLLER

The results of the operations carried out by the slides 12, $12_1$ in the counting frame are printed by means of printing members, the construction and operation of which are similar to those described in my U. S. Patent No. 2,562,172.

However, in the present machine, the control of the printing roller is operated by means which are somewhat different.

As shown in Figs. 1, 1a, 2, 2a, and 9, the printing roller 219 is rotatably mounted between two parallel plates 230 and $230_1$ keyed on a shaft 231 rotatably mounted in parallel plates 232 and $232_1$ united by means of two bars 233 and 234 extending across the machine. Said plates 232 and $232_1$ and said bars 233 and 234 form a rigid printing carriage frame inside which may rock the unit formed of shaft 231, plates 230 and $230_1$, and printing roller 219. A spring 235 tends to pull plates 230 and $230_1$ upwards, and two hooks 236 and $236_1$ are provided respectively on plates 230 and $230_1$ for cooperation with two pawls 237—$237_1$ keyed on a shaft 238 rotatably mounted on plates 232 and $232_1$, said pawls being adapted to lock plates 230 and $230_1$ against the action of spring 235. Two handles 239 and $239_1$ are provided on plates 230 and $230_1$, for the purpose of pushing said flanges downwards against the action of a spring 235, for the purpose of engaging hooks 236 and $236_1$ with pawls 237 and $237_1$.

Another lever 240 is rotatably mounted on plates $232_1$ and has a nose 241 adapted to push back pawls 237 and $237_1$ and disengage said pawls from hooks 236 and $236_1$. When a pressure is exerted by the operator on said lever 240, parallel plates 230 and $230_1$ are unlocked and rise, together with printing roller 219, under the action of spring 235, thus permitting the front feeding of documents which are to be printed by the machine.

Rails 242 and 243 are fixed to plates 2 and 3 of the machine (Figs. 1, 1a, 2, 2a, 4, 9 and 10), and the printing carriage is slidably mounted on said rails. A cross bar 244 extends between plates 232 and $232_1$ and a rack 245 is slidably mounted on said bar by means of a slot and bolt arrangement. A spring 253 tends to hold back said rack towards the right hand side of the carriage; a toothed wheel 246 (Fig. 9) engages rack 245 so that when the wheel turns clockwise, the carriage is moved towards the right and when the wheel turns counter-clockwise, the carriage is moved to the left. One end of a link 247 is rotatably mounted at the right hand side end of rack 245 and the other end of said link is connected to a lever 248 rotatably mounted on a support 249 fast with plate 232. The end of lever 248 which is opposite that connected to link 247 carries a stud 250 adapted to press against another stud 251 carried by a lever 252 rotatably mounted on plate 230.

Lever 252 is provided with another stud 253 adapted to push on a stud 256 carried by a slide 255 when said lever 252 rotates about its pivot 254. Slide 255 is slidably mounted on plate 230 and has a hooked nose which cooperates with a ratchet-wheel 257 keyed on the shaft of the printing roller 219.

When wheel 246 starts to move counterclockwise, when observing the machine from the rear, as in Fig. 9, said wheel drives the carriage towards the left as above explained, but before that the rack 245 slides along bar 244 by a small distance, causing lever 248 to rotate clockwise, whereby stud 250 pushes stud 251 and lever 252 is pulled towards the right. Stud 253 then pushes back stud 256 which causes slide 255 to move backwards, thereby driving printing roller 219 in rotation, the sliding length of slide 255 being such that said printing roller is rotated through an angle corresponding to the desired spacing of the lines to be printed on printing roller 219.

The driving of the carriage of printing roller 219 is operated by the following mechanism:

On a shaft 262 driven by the electric motor incorporated with the machine, is keyed a pinion 261 which engages a toothed wheel 261a the shaft of which is carried by an extension of a plate 258 rigidly connected to a base plate 213 attached to strut 6 (Figs. 2, 8 and 9). Said plate 258 carries a trunnion 259 on which rotates a double pinion 260 which engages, on the one hand, toothed wheel 261a and, on the other hand, a toothed wheel 263 which meshes with a similar toothed wheel 264. Toothed wheels 263 and 264 are respectively mounted for rotation on socket shaped members 265 and 266 rigidly connected to plate 258, and respectively carry a pair of driving dogs 267, 268 rotatively connected thereto in such a manner that said dogs move in a plane which is perpendicular to the plane of rotation of wheels 263 and 264.

On a plate 269 (Fig. 8) fixed to plate 258 by means of struts 270 are rotatably mounted two ratchet wheels 271 and 272, respectively combined with pinions 273 and 274 which mesh with toothed wheel 246. In socket shaped members 265 and 266 and in the supports of the combined ratchet wheels 271, 272 and pinions 273, 274, respectively, are slidably mounted two shafts 275 and 276, each carrying a collar 277, 278 engaging slots provided in the tails of dogs 267 and 268, respectively. A third plate 279, rigidly held in the body of the machine, is provided with bearing holes in which slide blocks 284 and 285 forming extensions of shafts 275 and 276, respectively. Said blocks are provided with annular grooves in which engage studs 282 and 283 carried by the respective arms of a two-armed lever 281 keyed on a vertical shaft 280 rotatably mounted in the frame of the machine, and on which is also keyed an oscillating horizontal plate 287 carrying on its upper face two studs 307, and on its lower face a roller 288 (Figs. 8 and 10). As may be seen from Fig. 8, a counterclockwise rotation of lever 280, will cause a longitudinal sliding movement of shafts 275 and 276 and thereby the engagement of trigger members 267 with ratchet wheel 271 and disengagement of trigger members 268 from ratchet wheel 272 and, conversely, a clockwise rotation of shaft 280 will cause a longitudinal sliding movement of the said shafts in the opposite direction and thereby the disengagement of dogs 267 from ratchet wheel 271 and the engagement of dogs 268 with ratchet wheel 272. Resilient ball latches 286 provided in bosses carried by plate 279 are adapted to hold lever 281 in one position or the other, and the various members are arranged in such a manner that, when lever 281 is brought in such a position that it is parallel to plate 279, the dogs 267 and 268 are disengaged from both the ratchet wheels 271 and 272.

In angle members 289 (Fig. 10) rigidly connected to plate 279 is slidably and rotatably mounted a shaft 290 on which is keyed a plate 291 adapted to cooperate with roller 288 of plate 287, either on one side or on the other, according to the position of shaft 290, the plate 291 carrying a roller 292 adapted to cooperate with a hook 294 rotatably mounted on a triangular supporting plate 293 rotatably mounted in the frame of the machine (Figs. 1 and 2). Said plate 293 is applied (Fig. 2) by means of a spring 293a, against a bar 212a rigidly connected with a shaft 212 rotatably mounted in the frame of the machine and on which is keyed a lever 214 carrying a roller 215 which cooperates with a cam 216 keyed on shaft 39. A spring 294a also connects hook 294 to bar 212a.

A tabulation bar 295 (Fig. 12) extends along cross bar 244 of the carriage and is rigidly held thereon. Said bar is provided with regularly spaced holes in which can be located tabulation stop members 296. Said tabulation stop members are adapted to cooperate with latches 297 each having a longitudinal slot engaged on a stud 299 carried by a plate 298 which is rigidly held in the frame of the machine, whereby said latches can both slide on said plate 298 in a direction which is substantially perpendicular to tabulation bar 295 and slightly rotate about studs 299. Two levers 300 (Figs. 10 and 11) are rotatably mounted between a plate 302 (Fig. 10) rigidly connected to plate 298 and said plate 298, and are provided with extensions having a rounded end 300a engaging in a groove 297a in each of latches 297. Said levers are normally pressed against studs 301 carried by plate 298, under the action of springs 303. A second pair of levers 304 (Figs. 10, 11 and 12) are similarly mounted between plate 298 and plate 302 and are pressed against said studs 301 by springs 305. Levers 300 and springs 303 tend to push latches 297 towards tabulation bar 295 whereas levers 304 and springs 305 tend to apply said latches against a central stud 306 carried by plate 298.

Levers 304 have sides 308 which are adapted to cooperate with the studs 307 carried by rotatable plate 287. On the other hand, a second oscillating plate 311 is carried by horizontal plate 302. Said oscillating plate 311 carries, on its lower face, two studs 312 (Fig. 10) one of the other of which is adapted to cooperate with one or the other of studs 307 according to the direction in which said plate 311 is oscillated. The studs 307 are also adapted to cooperate respectively with two levers 309 rotatably mounted on a support which is a part of the frame of the machine. Said levers are pulled against each other by a spring 309a and are each provided with a loading weight 310. Oscillating plate 311 has two rounded edges adapted to cooperate with studs 314 provided on levers 300, and a longitudinal extension 317 adapted to cooperate with stop members, not shown, rigidly mounted at each end of the carriage of the printing roller.

On a support held by plate 3 of the machine (Fig. 11) is rotatably mounted a hand lever 315 which carries two oscillating arms 318 urged toward each other and against a stud 318a, by a spring 318b, said arms forming a resilient fork which engages a stud 316a carried by a rod 316 connected to plate 311. A similar lever 322, provided with the same resilient fork system is adapted to control a rod 323 rigidly connected to the end of shaft 290.

On said shaft 290 is also keyed, besides plate 291, a hook shaped member 320 adapted to cooperate with the lever 300 on the left hand side of Fig. 11 when shaft 290 is pushed towards the left and shaft 290 is rotated in the counterclockwise direction as seen in Fig. 10.

Finally, a pin 319 is slidably supported in the frame of the machine, one end of said pin being adapted to cooperate with oscillating plate 287 while the other is adapted to cooperate with a resilient contact 321 which is arranged in the supply circuit of the motor of the machine.

The control of the movements of the carriage is performed as follows, assuming that the sheet which is placed on the printing roller comprises a certain number of columns provided for the printing of the registrations and results of operations carried out in some or all of the counting frames of the machine, and that tabulation stop members 296 have been placed on tabulation bar 295 in convenient places for stopping the carriage, through cooperation of said stop members with latches 297, in the positions corresponding to the printing of said registrations or results in the desired columns.

The motor having been started for the general operation of the machine, shaft 39 is rotated as above described in the direction shown by the arrows in Figs. 1 and 2, and shaft 262 is rotated clockwise when looking at the machine from the rear, as shown in Fig. 9.

During the rotation of shaft 39, cam 216 releases lever 214 and shaft 212 rotates counterclockwise as seen in Figs. 1 and 2. Hook 294 then passes underneath roller 292, while oscillating against the action of spring 294a, and thereafter immediately rises behind said roller under the action of said spring. After a given rotation of shaft 39, cam 216 pushes back lever 214, which causes the clockwise rotation of shaft 212. The head of hook 294 then pushes roller 292 upwards and causes the rotation of plate 291 and of shaft 290, whereafter roller 292 falls back behind hook 294 and plate 291 resumes its original position.

If the operator has previously pushed lever 322 towards the left, which means that shaft 290 has been drawn towards the right, plate 291, during its upward rotation, pushes on the right hand side of roller 288 and plate 287 oscillates to the position shown in Fig. 8. Dogs 267 engage with ratchet wheel 271 and pinion 273 is therefore driven by wheel 263. Consequently, wheel 246 rotates in the direction shown by the corresponding arrow in Fig. 9 and draws rack 245 and the whole carriage towards the left of the machine (Fig. 9 being a view from the rear of the machine and the directions therefore being reversed in said figure). It may be remarked that, in this case, there is no relative movement between rack 245 and bar 244 and that lever 248 therefore remains inactive.

When, during the above described movement of the carriage, a tabulation stop member 296 reaches latches 297, it begins by pushing back the right hand latch 297 (Figs. 11 and 12) against the action of spring 303, transmitted by lever 300, then it hits the latch 297, which left hand latch rocks around the corresponding stud 299 and thereby pushes the corresponding lever 304 against the action of its spring 305. Said lever rocks about its pivotal axis and the edge 308 thereof pushes back the corresponding stud 307 of oscillating plate 287, said stud having been previously brought near the said edge by reason of the positioning of said plate 287. This causes said plate 287 to be brought back to the position in which lever 281 is parallel with plate 279 and in which both pairs of dogs 267 and 268 are disengaged from ratchet wheels 271 and 272, respectively. Pinion 273 therefore ceases to be driven by wheel 263 and the driving of the carriage is interrupted.

During the above described operation, the carriage has moved slightly beyond the position at which it ought to have been stopped, but the spring 305 of the lever 304 on the left hand side causes said lever to push on the latch 297 which had caused the unclutching of pinion 271, thereby bringing back the carriage to the desired position.

When plate 287 and lever 281 are pushed back to the unclutching position the said plate and lever, due to inertia and to a possibly insufficient action of the corresponding ball latch 286, may have a tendency to oscillate too far and cause the dogs 268 to engage ratchet wheel 272, which would cause the carriage to start in the other direction, but this is prevented by the fact that, towards the end of the oscillating movement of plate 287, a stud 307 thereof hits the corresponding lever 309 and the movement of the plate is damped both by the action of spring 309a and of the inertia of the weights 310.

Upon a new rotation of shaft 39 when a further operating cycle of the machine is caused to be performed, the same operations as above described are repeated. Provided the position of lever 322 has not been changed, the carriage is driven once more towards the left. This is made possible by the fact that, when shaft 290 is shifted towards the right, the hook shaped member 320 is opposite the lever 300 corresponding to the left-hand latch 297 and when shaft 290 is rotated with plate 291 which causes the starting of the carriage, said member 320 presses on said lever 300 and causes it to rotate and to retract the corresponding latch 297, so that the tabulation stop member 296 which had previously been engaged between latches 297, is free to move towards the left. As shaft 290 rotates back immediately after, member 320 releases the corresponding lever 300 and the retracted latch resumes its position, whereby it can stop the carriage as above described when the next stop member comes to hit it.

If the lever 322 is pushed towards the right before the carriage is started as above described, shaft 290 is shifted towards the left, and when plate 291 rotates under the action of hook 294 it cooperates with the left hand side of roller 288 and plate 287 is pushed in the direction opposite to that shown at Fig. 8. As a consequence, dogs 268 engage ratchet wheel 272, pinion 276 is driven by wheel 264 and causes wheel 246 to rotate in a counterclockwise direction, when looking at Fig. 9, which means that the carriage is driven towards the right hand side of the machine. Exactly the same operations as above described are repeated, the functions of the left hand side and right hand side latches 297 and of the corresponding members being reversed.

However, it should be noted that in this case, when wheel 246 begins to rotate, it begins by causing rack 245 to slide along bar 244, the printing roller 219 being then rotated as already described.

The control of the starting of the carriage in one direction or the other, with a rotation of the printing roller when the carriage is moved towards the right may also be operated manually by means of lever 315.

If the operator pushes lever 315, say, towards the right, oscillating plate 311 is rotated counterclockwise and the left hand side stud 312 carried by said plate pushes the corresponding stud 307 of plate 287, thereby establishing the necessary conditions for driving the carriage towards the left. Immediately before these conditions are established, the rounded edge 313 on the left hand side of plate 311 acts as a cam upon the stud 314 of the lever 300 on the same side, thereby causing the said lever to rotate against the action of its spring 303, which causes the latch 297 on the left hand side to be retracted. The carriage is thus free to move towards the left until it is stopped by the cooperation of the next tabulation stop member with the latches 297, as above described.

The driving of the carriage towards the right is obtained in exactly the same conditions by pushing lever 315 to the left.

Should the operator want the carriage to be driven in one direction or the other over a longer distance than that which is determined by the interval between two consecutive tabulating stops, he can obtain this result by continuously holding lever 315 in the direction of the desired movement for the carriage. This movement may be continued until the extension 317 of plate 311 hits the stop members provided at the ends of the carriage, in which case plate 311 is brought back to its "neutral" position, stud 316a of rod 316 then causing the arms 318 to be pushed apart.

It is to be noted that pin 319 is arranged in such a manner that it cuts off contact 321 when plate 287 occupies its "neutral" position. This avoids continuous and unnecessary rotation of the motor driving shaft 262.

AUTOMATIC CONTROL OF THE SELECTING MEMBERS

Instead of being controlled by the operator by means of keys 92 and 93 of the keyboard, the stop bars 28, 28, and 91 may, according to the invention, be controlled automatically, according to the position of the carriage of the printing roller along rails 242 and 243, that is to say according to the column of the sheet which is in front of the printing members.

Figure 14:
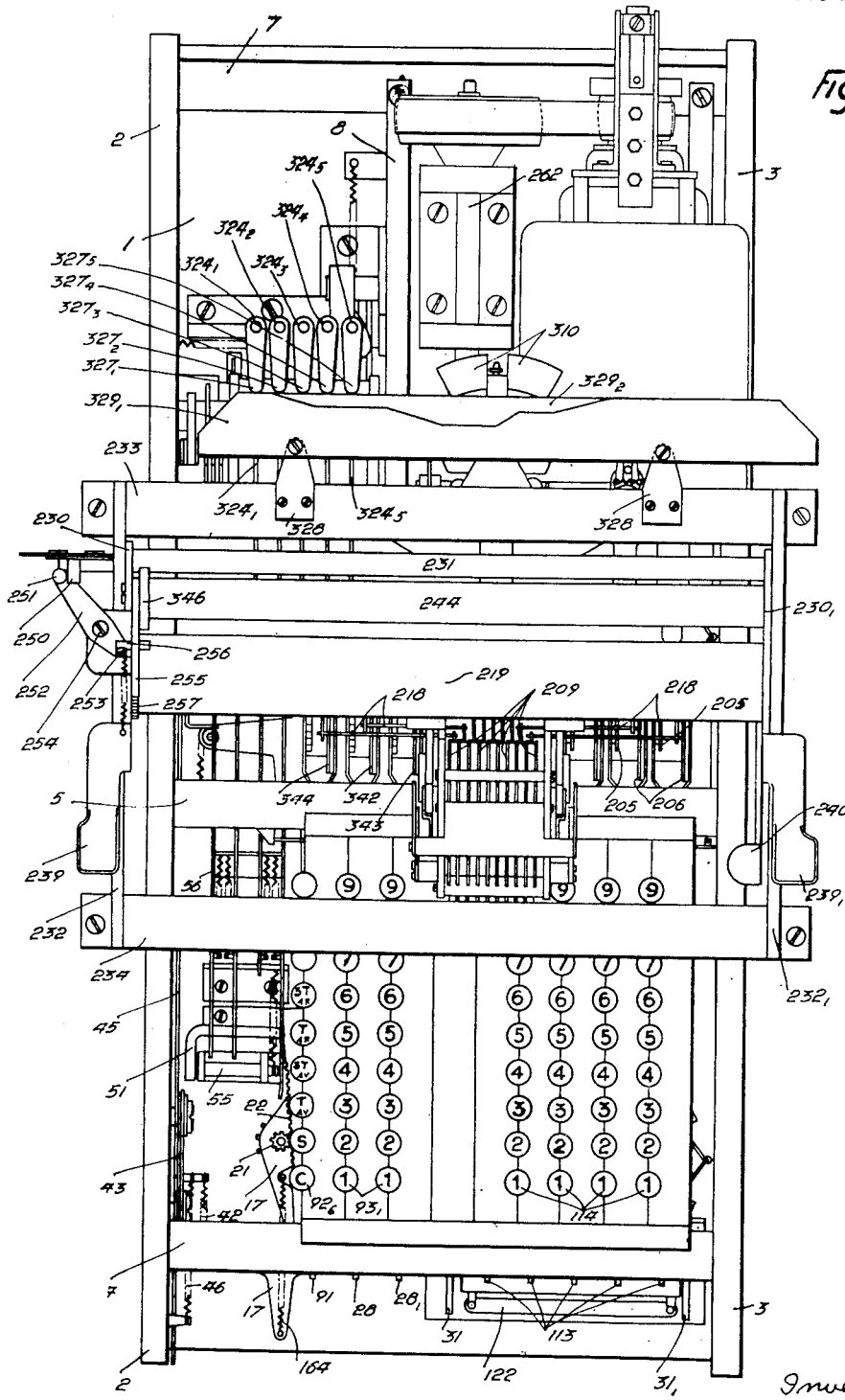
Fig. 14 is a plan view from above of the whole of the machine, the cover being removed.

For this purpose, a number of levers 324 are provided at the back of the machine, said levers being rotatably mounted on a shaft 325 held by supports 326 secured to rail 242 (Figs. 1 and 14).

Each of said levers is provided at its upper end with a roller 327 adapted to cooperate with the rear edge of a corresponding bar 329, all the bars 329 being rigidly secured by means of supports 328 to the longitudinal bar 233 of the carriage, and at its lower end with an extension 334 engaged under a roller 332 carried on one side by a bar 331 which slides vertically in appropriate guides secured to the frame of the machine. Each vertical bar 331 terminates at its lower end as a finger 217 (Fig. 1).

In the machine as shown there are five levers 324, viz. one lever with the reference number 324 intended for controlling the selection of the nature of the operations performed by the machine, and four levers denoted respectively by $324_2$, $324_3$, and $324_4$ and $324_5$ intended for controlling the selection of the counting frames in the counting units. As a matter of fact, only levers $324_2$ and $324_3$ are used in the present case, as is explained hereafter.

The finger 217 of vertical bar 331 corresponding to lever $324_2$ is adapted to cooperate with a stepped plate 333 (Fig. 1a) secured laterally on stop bar 28 near the rear end thereof, the positioning of the steps of said plate being such that according to the vertical position of finger 217, stop bar 28 can be stopped in its rearward movement in the various positions in which it can be stopped by depressing keys 93 of the left hand column of the keyboard, that is to say nine successive positions.

The rear edge of bar $329_2$ with which cooperates the roller $327_2$ carried by lever $324_2$ is stepped in such a manner that when the carriage of the printing roller moves along rails 242, 243, roller $327_2$ follows said steps, thereby allowing lever $324_2$ to rotate clockwise (Fig. 1) if roller $237_2$ passes from a given step to a deeper step, or counterclockwise in the other case. In order to simplify the drawings, the steps in bar $329_2$ have not been shown, but they can be provided in a manner similar to the steps in bar $329_1$, described hereafter. The corresponding vertical bar 331 will therefore be lowered or raised, as the case may be. The depth of the steps on bar $329_2$ are determined in such a manner that finger 217 of the vertical bar 331 in question may be brought, for each position of tabulation of the carriage, to the level at which the cooperation of said finger with the stepped plate 333 will cause the stopping of bar 28 in the position which corresponds to the selection of the counting frame in which should be carried out the registrations or operations which are to be printed in said position of tabulation.

Bar $329_3$ which cooperates with the roller $327_3$ is arranged in a similar manner, the vertical bar 331 corresponding to lever $324_3$ being adapted to cooperate, in the same conditions, with a stepped plate like 333 secured on stop bar 28.

Two levers $324_2$ and $324_3$ are sufficient when the machine, as presently shown, comprises not more than nine counting frames in each counting section, but the two further levers $324_4$ and $324_5$ are provided for the case of counting sections comprising ten or more counting frames, but not more than ninety nine. In such a case, two stop bars, with corresponding rows of keys, must be provided for each section, in a manner similar to that described and explained in my U. S. Patent No. 2,562,172. Four stop bars such as 28, $28_1$ are then present, and there must therefore be four corresponding vertical bars 331 and levers 324. Generally speaking, there should be as many levers 324 for the control of the selection of counting frames as there are denominations in the number of said counting frames in each counting section, multiplied by the number of said sections.

Lever $324_1$ also controls a vertical sliding bar 331 which cooperates with a stepped plate 333 secured on stop bar 91 (Fig. 4), in such a manner that said stop bar can be stopped, according to the position of said vertical bar 331, in the various positions in which it would be stopped by depressing one or other of the keys 92. The rear edge of bar $329_1$ which cooperates with roller $327_1$ of lever $324_1$, is provided with steps adapted to set lever $324_1$, and therefore the corresponding bar 331, for each tabulation position of the carriage, in the position which causes stop bar 91 to be stopped after it has been moved rearwards by the distance which is necessary for selecting the control of the operation which has to be performed in the corresponding position of tabulation.

The carrier being stopped in a given tabulation position before the beginning of an operating cycle of the machine, the notches or steps in bars $329_1$, $329_2$ and $329_3$ which correspond to said given position of tabulation are respectively in front of the levers $324_1$, $324_2$, $324_3$. As the rollers 327 of said levers are applied against the corresponding bars 329 by the weight of the vertical bars 331, levers $324_1$, $324_2$ and $324_3$ are rotated through an angle which is proportional to the depth of said notches or steps, and the vertical bars 331 are respectively placed at such heights that when the stop bars 28, $28_1$ and 91 are released during the operation of the machine and said bars are driven towards the rear of the machine, said bars are stopped, by cooperation of stepped plates 333 with the fingers 217 of bars 331, in the positions which correspond to the selection of the counting frames and of the operations the respective contents and results of which are to be printed in the tabulation position considered.

What I claim is:

In a calculating machine of the type described, adapted to perform various calculating operations incorporating, in a common frame, a plurality of counting sections each comprising a number of piled up counting frames adapted to shift laterally in one direction and the other in said counting sections and containing longitudinally sliding calculation slides adapted to cooperate, when said frames are shifted laterally, in a given direction, with movable driving members controlled by sliding stop bars cooperating with keys in a keyboard, means being provided to control the lateral shifting of the counting frames, said means comprising a number of longitudinally sliding stop bars provided with stopping members adapted to cooperate with keys of the keyboard arranged in rows, for stopping the said stop bars in given positions in their longitudinal sliding movements against the action of a spring which tends to drive said stop bar towards the rear of the machine, each of said positions corresponding to the shifting of a given counting frame, means being further provided to control the selection of the nature of the operations which are to be performed by the machine, said means comprising a longitudinally sliding stop bar provided with stopping members adapted to cooperate with a row of keys in the keyboard for stopping the said stop bars in given positions in their longitudinal sliding movement against the action of a spring which tends to drive said stop bars towards the rear of the machine, each of said positions corresponding to the selection of a given operation, and means being further provided to print the results of the operations performed by the machine, said means comprising a carriage slidably mounted on the frame of the machine for transverse movement in one direction and the other, a printing roller rotatably mounted on said frame, means for driving said carriage in one direction and the other, and means for stopping said carriage in predetermined positions of tabulation each corresponding to the printing of results of given operations carried out in given counting frames, a mechanism for the automatic control of the shifting of counting frames and of the selection of the operations to be performed by the machine, comprising, in combination, a number of notched bars secured longitudinally on the carriage, parallel to the directions of movement of said carriage, equal to the total number of stop bars provided for the control of the shifting of the counting frames and the control of the selection of operations, said bars each having a free longitudinal side extending along the total length of the printing roller and provided with stepped notches, a shaft secured on the frame of the machine, parallel to the direction of movement of said carriage, a number of double armed levers rotatably mounted on said shaft, equal to the number of said notched bars, each of said levers being provided, on one arm, with a mechanical contact member adapted to bear against the said longitudinal side of one of said notched bars, the contact member of each of said levers cooperating with a different notched bar, stepped members secured on each of the stop bars controlling the shifting of the counting frames and the selection of the operations, said stepped members having an oblique side facing the rear of the machine and provided with steps having a substantially vertical edge on said side, vertical bars slidably mounted in the frame of the machine, in number equal to that of the said stop bars, each of said vertical bars having an upper end connected to the other arm of one of the said levers, and a lower end adapted to cooperate with the steps in the stepped member secured on one of said stop bars for stopping said stop bar in the same successive given positions as those in which it can be stopped by cooperation with the corresponding keys in the keyboard, the stepped notches in the said notched bars having respectively such a position and such a depth that to each position of tabulation of the carriage corresponds a position of said vertical bars which determines the stopping of the stop bars at the positions corresponding to the shifting of the counting frames and the selection of the operations which correspond to said position of tabulation of the carriage.

No references cited.